(12) United States Patent
Smith et al.

(10) Patent No.: US 7,088,343 B2
(45) Date of Patent: Aug. 8, 2006

(54) EDGE TOUCHPAD INPUT DEVICE

(75) Inventors: Barton A. Smith, Campbell, CA (US); Shumin Zhai, San Jose, CA (US)

(73) Assignee: Lenovo (Singapore) PTE., LTD., Singapore (SG)

( * ) Notice: Subject to any disclaimer, the term of this patent is extended or adjusted under 35 U.S.C. 154(b) by 769 days.

(21) Appl. No.: 09/845,552

(22) Filed: Apr. 30, 2001

(65) Prior Publication Data

US 2002/0158838 A1    Oct. 31, 2002

(51) Int. Cl.
*G09G 5/00*    (2006.01)
(52) U.S. Cl. ...................................... 345/173; 345/168
(58) Field of Classification Search ........ 345/173–174, 345/161, 163, 166, 179, 156, 427, 168
See application file for complete search history.

(56) References Cited

U.S. PATENT DOCUMENTS 5,867,111 A * 2/1999 Caldwell et al. .............. 341/33
5,910,802 A * 6/1999 Shields et al. ............... 715/808
5,920,309 A * 7/1999 Bisset et al. ................. 345/173
5,988,902 A * 11/1999 Holehan ................... 400/479.1
6,043,809 A * 3/2000 Holehan ...................... 345/168
6,369,803 B1 * 4/2002 Brisebois et al. ............ 345/173
6,411,280 B1 * 6/2002 Aarts et al. .................. 345/163
6,473,069 B1 * 10/2002 Gerpheide ................... 345/157
6,507,338 B1 * 1/2003 Liao et al. ................... 345/173
6,509,847 B1 * 1/2003 Anderson ..................... 341/34
6,608,628 B1 * 8/2003 Ross et al. ................... 345/619

* cited by examiner

*Primary Examiner*—Amr A. Awad
*Assistant Examiner*—Kimnhung Nguyen
(74) *Attorney, Agent, or Firm*—Jose Gutman; Jeffrey N. Giunta; Fleit, Kain, Gibbons, Gutman, Bongini & Bianco P.L.

(57) ABSTRACT

A touchpad input device is provided that is disposed about at least a portion of at least one outside edge of an electronic device housing. The present invention also provides electronic devices comprising the present touchpad input device. Furthermore, the present invention provides a method of sensing user input about an outside edge of an electronic device housing, wherein the user input is detected by a user input detector that relays a signal to a control circuit to be acted upon appropriately.

10 Claims, 4 Drawing Sheets

EDGE TOUCHPAD INPUT DEVICE

BACKGROUND OF THE INVENTION

1. Field of the Invention

This invention generally relates to the field of electronic input devices, and more particularly relates to touchpad input devices.

2. Description of Related Art

Space on electronic devices, particularly on small, portable electronic devices, is scarce and valuable. Furthermore, electronic devices, especially portable devices, are continually decreasing in size and weight. At the same time, they are increasing in complexity and functionality. Electronic devices include, for example, laptop computers (also referred to as notebook computers), desktop computers, keyboards, monitors, personal digital assistants/electronic organizers, communication devices such as cellular phones and pagers, navigation devices such as global positioning systems (GPS's), medical devices, data collection devices such as bar code scanners, and video game devices. Most electronic devices feature a display that presents the user with a graphical user interface, which requires various input tasks such as cursor movement, scrolling, and zooming in order to navigate within the display. Well-designed input devices are critical for effectively controlling the numerous functions of electronic devices and navigating increasingly complex graphical displays. However, a major challenge is confronted in designing input devices that are easy to use, comfortable for the user, and accurate while at the same time do not require any additional dedicated housing space. Such input devices that do not require additional dedicated housing space allow the overall size and weight of an electronic device to be minimized, which is highly desirable for consumers, particularly in the case of portable devices. Even in non-portable devices, such as desktop computers, it is highly desirable to minimize the overall size of the device so that it occupies a minimum of desktop space, for example.

Current examples of input devices include the mouse, touchpads, trackballs, directional keys, selector buttons, toggle switches, joysticks, rotating dials, and the small, fingertip-actuated, isometric joystick stubs frequently located between the keyboard keys of laptop computers. The mouse, commonly used with desktop computers, is typically unfeasible for use with portable devices, which require an integrated input device. Integrating these various input devices into electronic systems, particularly portable electronic devices, typically requires additional housing space to be dedicated to the input device, necessitating an increase in the overall size and weight of the electronic device.

Touchpad input devices, also referred to as touch sensor input devices, are used in such devices as the GLIDEPOINT input pad, the PALM PILOT, and various laptop computers, in which the touchpad is typically located on the face of the device, such as below the keyboard in laptop computers or below the display in personal digital assistants such as the PALM PILOT. Touchpad input devices typically use technology such as capacitive sensing technology to provide a touch-sensitive surface. The user merely touches the touchpad, typically with a finger, and the contact from touching is detected and translated into electrical input signals. The outer edges of some touchpads are programmed for up-down and left-right scrolling functions, while the center of the touchpad may be used for controlling a cursor's position or for entering letters, numbers, or other symbols. However, the distinction between the different functional areas of such touchpads is not clear. Furthermore, the size of the different functional areas of the touchpad is limited by the size of the touchpad itself and, generally, touchpads must be small compared to the overall size of the electronic device due to inefficient use of housing space by the input device, and the need to minimize the overall size of the electronic device. Smaller functional areas of the touchpad result in limited functionality of the touchpad, reduced input resolution, and less precise control, such as when controlling cursor movements in a graphical display. Furthermore, such small touchpads are typically awkward and inefficient to use.

Touchpad input devices generally use either capacitive (i.e., charge storing), resistive, or semiconductive sensing technology to detect user input, i.e., touch. Capacitive sensing technology is the most common. Generally, in capacitive sensing technology, oscillatory circuits at each corner of the touchpad are connected to electrodes to provide a constant voltage across the touchpad. The touchpad has a capacitive layer that may be composed of, for example, indium tin oxide. Contact with the touchpad, such as by touching with a finger or other conductive object, draws current to the point of contact. The amount of current drawn is proportional to the distance of the contact from the sides of the touchpad. The variation in current flow results in a corresponding change in the electrical frequencies of the oscillatory circuits; this change in frequency can be translated into x and y coordinates, thereby precisely establishing the position of the contact. This information can then be relayed through a control circuit to generate corresponding output, such as cursor movement or scrolling within a display. In addition to touchpads, capacitive sensing technology is also commonly used in touchscreens, such as in kiosks, where it provides an effective and easy to use means for selecting desired functions depicted within a display, such as to obtain information.

Resistive touchpads work in much the same manner as capacitive touchpads, except that changes in resistance, rather than capacitance, are detected. Semiconductive touchpads generally feature semiconductive layers below the surface of the touchpad that can sense pressure applied toward the touchpad by sensing increased contact between the semiconductive layers. Another type of touchpad is the proximity sensitive, or charge transfer, pad that does not require actual physical contact for input. Rather, proximity sensitive pads can sense the electric charge of a finger or other conductive object that is in close proximity, but not necessarily in contact with, the pad.

Non-contact electric-field-based position sensors allow the position of a hand or piece of conductive material to be determined at some distance from the transducers. Similarly, optical sensors can determine the position of visible objects at a distance. Any of these sensing means may be used as input to a device by which the user can manipulate the actions of the device by position or movement of a hand or other object. Thus the touchpad as described herein consists of the area or region in space over which position and motion can be sensed, and is not limited to the sensing apparatus itself or its immediate proximity.

Generally, proximity sensors are well known. For example, teachings of electric field detection of a user's finger, hand, etc, may be found in the following U.S. patents: U.S. Pat. No. 5,914,701, entitled "Non-Contact System For Sensing And Signalling By Externally Induced Intra-Body Currents", and U.S. Pat. No. 5,844,415, entitled "Method For Three-Dimensional Positions, Orientation And Mass Distribution", and U.S. Pat. No. 6,066,954, entitled "Apparatus For Resolving Presence And Orientation Within A Defined Space", and U.S. Pat. No. 5,914,610 entitled "Apparatus And Method For Characterizing Movement Of A Mass Within A Defined Space". The teachings of the above referenced U.S. patents is hereby incorporated by reference. The above referenced U.S. patents illustrate how the position and motion of a user's hand or finger can be detected without contact.

Conventionally, input devices, particularly touchpads, are located on the face of a device housing, typically below the keyboard or graphical display. However, positioning an input device at such a location requires additional housing space to be dedicated to the input device, necessitating an overall increase in size and weight of the electronic device. Furthermore, such an arrangement may be unnatural and uncomfortable for the user. Thus, conventional input devices do not effectively fulfill the two design objectives of providing for efficient input and minimizing the overall size and weight of the devices.

Therefore a need exists to overcome the problems with the prior art as discussed above, and particularly for an input device that is accurate and easy to use, that exploits natural hand positioning and hand movements for input, and that makes use of previously unused space on a device housing, rather than requiring additional housing space dedicated to the input device, in order to minimize the overall size and weight of an electronic device.

SUMMARY OF THE INVENTION

According to a preferred embodiment of the present invention, an electronic device comprises a housing having at least one outside edge, at least one touchpad disposed along at least a portion of the at least one outside edge, and a user input detector, electrically coupled to the touchpad, for detecting user input from the touchpad along at least a portion of the outside edge.

According to an alternative preferred embodiment of the present invention, a touchpad input device comprises a touchpad disposed along at least a portion of at least one outside edge of a housing. A user input detector is electrically coupled to the touchpad for detecting user input from the touchpad and transmitting input signals. A control circuit, electrically coupled to the user input detector, acts upon the input signals from the user input detector.

A preferred method comprises the steps of touching about the outside edge of a housing, detecting the touching, and transmitting an electrical signal upon detecting the touching to a control circuit, wherein the control circuit acts upon the electrical signal.

Preferably, user input can be detected via contact and via non-contact detection means. The latter preferably allows the position and motion of, for example, a user's hand or finger to be detected without actual contact. The sensing can be done from a short distance away.

DESCRIPTION OF THE PREFERRED EMBODIMENTS

Figure 1:
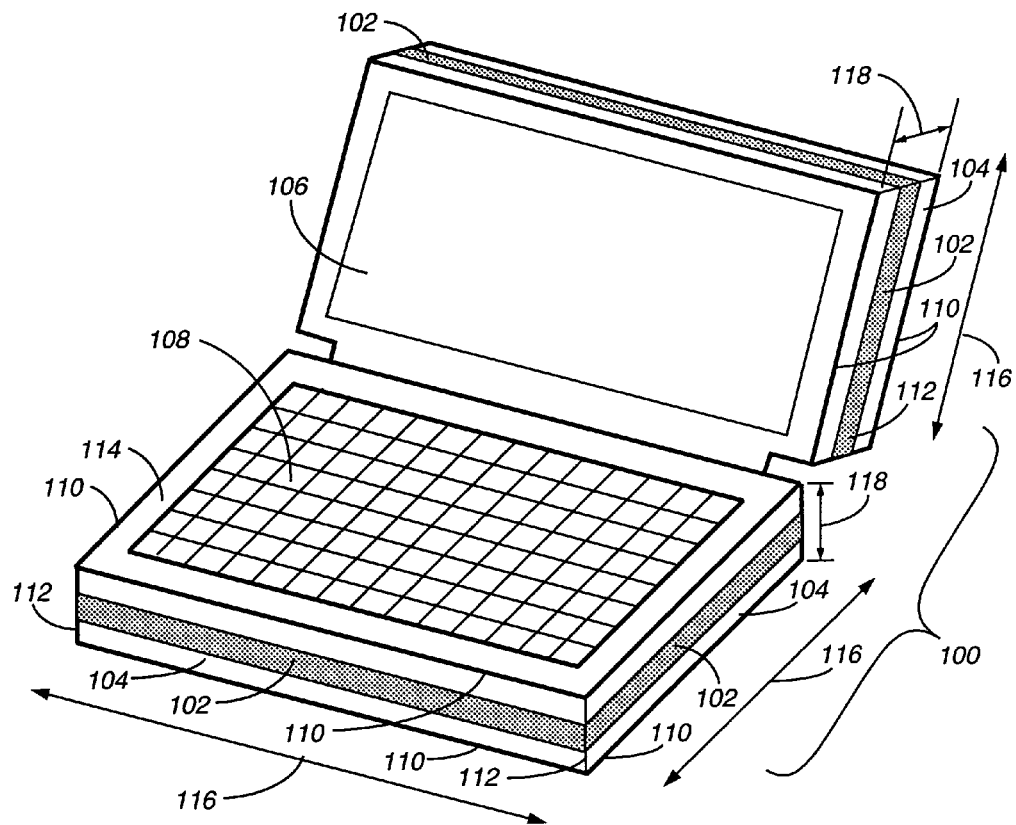
FIG. 1 is a diagram of an exemplary electronic device illustrating a touchpad input device disposed along an outside edge of the electronic device housing in accordance with a preferred embodiment of the present invention.

The present invention, according to a preferred embodiment, overcomes problems with the prior art by providing an efficient input device that is easy to use and allows the overall size and weight of an electronic device to be minimized. The present invention achieves these advantages over the prior art and solves a need in the art by providing a touchpad input device that is disposed about at least a portion of at least one outside edge of an electronic device housing. The edge is a very valuable piece of virtually untapped real estate on the outside of electronic devices. Using tactile feel, it is also one of the most easily located areas on an electronic device. The present invention also provides electronic devices comprising the present touchpad input device. Furthermore, the present invention provides a method of input comprising touching about an outside edge of an electronic device housing, wherein the touching is detected by a user input detector that relays a signal to a control circuit to be acted upon appropriately.

FIGS. 1, 2, 3, and 4 illustrate preferred embodiments of the present invention. Exemplary touchpad input devices and exemplary electronic devices comprising the touchpad input devices of the present invention are illustrated. Each of the illustrated embodiments comprises a device housing 100 having at least one outside edge 104, and a touchpad input device 102 disposed along at least a portion of the at least one outside edge 104. The touchpad input device 102 may also be referred to herein as the touchpad 102, touch-sensitive pad, or the touch sensor input device. Additionally, because preferred embodiments are long and narrow, the touchpad 102 may be referred to interchangeably as a touch-strip. The illustrated embodiments also comprise a display 106, which may be navigated by using the touchpad input device 102; however, the present invention is also useful in electronic devices that do not comprise displays. For example, the touchpad input device provided by the present invention is useful for replacing mechanical controls, such as for adjusting audio volume or other sound characteristics or for adjusting temperature. Any electronic device that comprises speakers or produces sound may be improved by implementing the touchpad input device for sound adjustment, such as for volume or balance control. Examples of electronic devices that are well suited for utilizing the touchpad input device for adjusting various sound characteristics, in addition to volume, include musical instruments such as electronic musical keyboards or electronic percussion instruments. An example of an electronic device that is well suited for using the touchpad input device for adjusting temperature is an electronic climate control unit in a house or office that is used to adjust heating and/or air-conditioning. In an exemplary climate control unit, the touchpad input device provides an easy to use device that allows a user to raise or lower the desired room temperature simply by sliding a finger up or down along the touchpad.

Exemplary devices such as these are particularly well suited for use by blind individuals since the positioning of the touchpad about the outside edge of a device housing allows the touchpad to be easily located by tactile feel.

As discussed, electronic devices that comprise the touchpad input device of the present invention may or may not have displays. Thus, the touchpad input device may be used to adjust or set any variable or parameter, regardless of whether or not the variable/parameter is depicted in a display.

Figure 2:
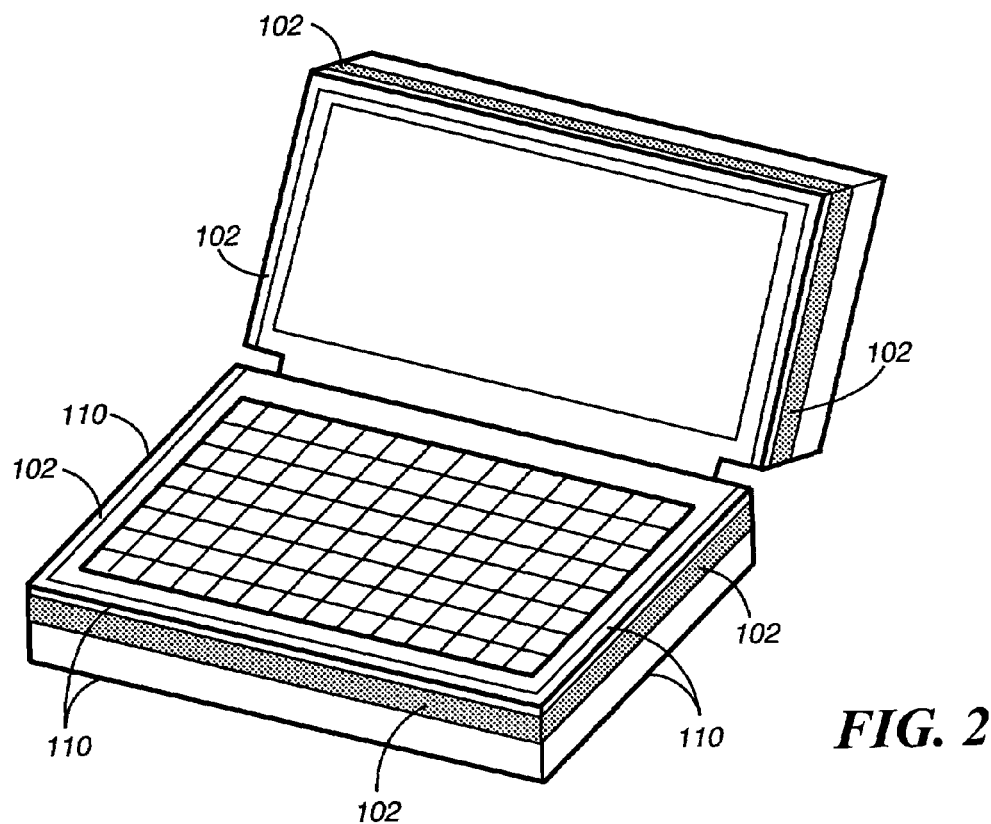
FIG. 2 is a diagram of an exemplary electronic device illustrating a touchpad input device disposed about a perimeter along an outside edge of the electronic device housing, according to a preferred embodiment of the present invention.
Figure 3:
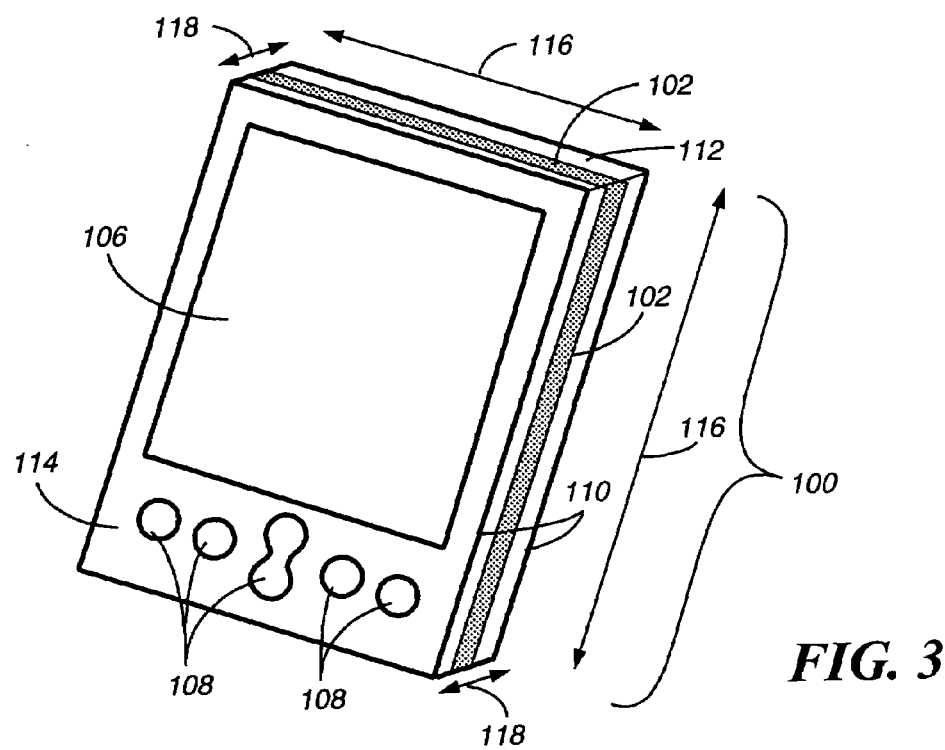
FIG. 3 is a diagram of an additional exemplary electronic device illustrating a touch pad input device disposed along an outside edge of the electronic device housing in accordance with a preferred embodiment of the present invention.
Figure 4:
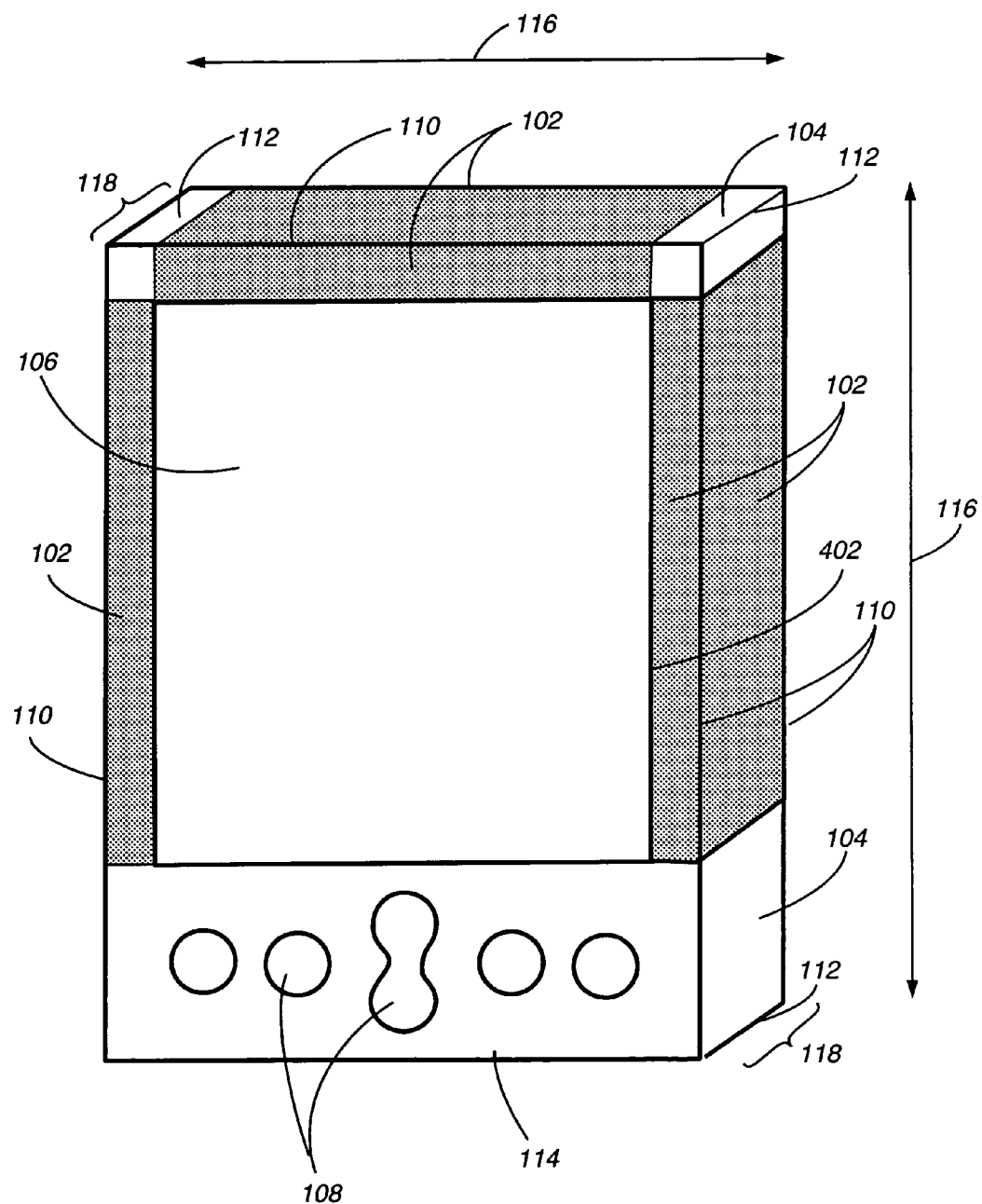
FIG. 4 is a diagram of an additional exemplary electronic device illustrating a touchpad input device disposed along an outside edge, and about a perimeter along the outside edge, of the electronic device housing in accordance with a preferred embodiment of the present invention.

The exemplary embodiments shown in FIGS. 1 and 2 show the touchpad input device applied to a laptop computer. FIGS. 1 and 2 also illustrate the touchpad input device 102 disposed along the outside edge of a keyboard and a display, the keyboard and display being integral parts of the exemplary laptop. However, the present invention is equally well suited for keyboards and displays that exist as isolated components. FIGS. 3 and 4 show the touchpad input device applied to a personal digital assistant, such as a PALM PILOT. FIGS. 3 and 4 can also readily be imagined as depicting displays, such as monitors, or wireless communication devices. However, these particular electronic devices are shown for illustrative purposes only; the touchpad input device provided by the present invention can be applied to any electronic device with a housing having at least one outside edge. For example, desktop computers, keyboards, monitors, wireless communication devices such as cellular phones and pagers, electronic navigation devices such as global positioning systems (GPS's), electronic medical devices, data collection devices such as bar code scanners, and video game devices would all benefit from the present invention. Any electronic device that accepts user input can incorporate the present invention along an outside edge of the device housing.

The touchpad input device provided by the present invention can be disposed either along an outside edge 104 of an electronic device, disposed substantially about a perimeter 110 along an outside edge 104 of the electronic device, or disposed substantially about both an outside edge 104 and a perimeter 110. As used throughout the present application, the term "outside edge" encompasses touchpads disposed about at least one outside edge 104, touchpads disposed substantially about a perimeter 110 along the at least one outside edge, and touchpads disposed about any combination thereof. Touchpads disposed about any corner edge 112 are also encompassed by the term "outside edge" as used herein. FIGS. 1 and 3 illustrate a touchpad 102 disposed about an outside edge 104 of an electronic device housing. FIG. 2 illustrates a touchpad 102 disposed substantially about a perimeter 110 along an outside edge 104 of an electronic device housing. FIG. 4 illustrates a touchpad 102 disposed substantially about both an outside edge 104 and a perimeter 110.

Furthermore, the touchpad 102 of the present invention can be disposed about any portion of at least one outside edge 104 or perimeter 110 along the at least one outside edge 104. For example, the touchpad 102 can be disposed about the entire length 116 and/or width 118 of at least one outside edge 104 or a perimeter 110, or any portion of the length 116 and/or width 118. For instance, the touchpad input device 102 may extend substantially about half the length 116 of at least one outside edge 104 or perimeter 110.

In preferred embodiments, the touchpad 102 is long and narrow; thus, the touchpad 102 may also be referred to interchangeably as a touch-strip. The touchpad 102 may be as long as the length 116 of an outside edge 104, or longer if it wraps around to multiple outside edges 104, and may be as wide as the width 118 of an outside edge 104, or wider if it wraps around the perimeter 110 and is disposed about a portion of a face 114. Since in the majority of electronic devices, the length 116 of an outside edge 104 may be substantially greater than the width 118 of an outside edge 104, the touchpad 102 generally comprises a long, narrow strip shape. The touchpad 102 may be as narrow as desired, as long as enough surface area is present to allow contact to be detected by a user input detector. In exemplary embodiments, for example, the touchpad 102 may be about one mm in width and about six inches in length. In other embodiments, the touchpad 102 may be, for example 0.5–30 mm in width, or wider, and long enough to cover the majority of the length 116 of an outside edge 104 of an electronic device.

According to a preferred embodiment of the present invention, as shown in FIGS. 1 and 3, a touchpad input device 102 is disposed along at least a portion of at least one outside edge 104 of an electronic device housing. The touchpad input device 102 may extend substantially around all outside edges 104 of the electronic device, as illustrated in FIGS. 1 and 3, or any portion thereof. Alternatively, the touchpad input device 102 may extend about a single outside edge 104. The touchpad input device may be disposed about any combination of outside edges 104, provided at least a portion of the touchpad input device 102 is disposed about a portion of at least one outside edge 104.

According to another preferred embodiment, as illustrated in FIG. 2, the touchpad input device 102 is disposed along a perimeter 110 along an outside edge 104. The perimeter 110 generally connects an outside edge 104 with a face 114 of the device housing. Such a perimeter 110 generally extends lengthwise along the outside edge. The touchpad input device may wrap around the perimeter 110, in which case the touchpad may be disposed about both a portion of the outside edge 104 and a portion of the face 114 of the electronic device housing, or the touchpad may be disposed strictly along the perimeter 110, in which case the touchpad occupies a slight amount of housing space on the outside edge 104 or the face 114. The perimeter 110 may be a sharp edge (for example, substantially rectangular), or, preferably, may be rounded. The touchpad input device 102 may extend substantially around all perimeters 110 of the electronic device, as illustrated in FIG. 2, or any portion thereof. Alternatively, the touchpad input device 102 may extend about a single perimeter 110. The touchpad input device may be disposed about any combination of perimeters 110, provided at least a portion of the touchpad input device 102 is disposed about a portion of at least one perimeter 110.

In the illustrated embodiments shown in FIGS. 1, 2, and 3, the touchpad 102 is disposed about the corner edge 112 that connects adjoining outside edges 104; however, the touchpad 102 may or may not be disposed about any corner edges 112. Such a corner edge 112 generally extends widthwise along the outside edge 104. The corner edge 112 also extends to area where the corner edge 112 connects with the perimeter 110. The touchpad input device 102 may wrap around a corner edge 112, in which case the touchpad may be disposed about a portion of two or more adjoining outside edges 104, or the touchpad may be disposed strictly about the corner edge 112, in which case the touchpad occupies a slight amount of housing space on adjoining outside edges 104. The corner edge 112 may be a sharp edge (for example, substantially rectangular), or, preferably, may be rounded.

As illustrated in FIGS. 1, 2, 3, and 4, the touchpad input device 102 can be disposed about at least one outside edge of a display housing. The touchpad input device 102 may be disposed about any combination of outside edges 104 of a housing 100 comprising a display 106. In the illustrated embodiments shown in FIGS. 1 and 2, the touchpad input device 102 is disposed about the outside edges 104 of a display housing of a laptop computer, the display 106 being an integral part of the laptop computer. However, the display may also be, for example, a component separate from the computer, such as a monitor for a desktop computer. A wide variety of electronic devices, such as the exemplary personal digital assistants illustrated in FIGS. 3 and 4, comprise integral displays contained within the device housing and would benefit from the present invention, which provides an optimal input device for navigating within the display.

As illustrated in FIG. 4, the touchpads 102 can be disposed adjacent to the display 106, and may further extend about the perimeter 110 and/or the outside edge 102. For example, the touchpad 102 may extend to the interface 402 of the display 106 and the housing 100, as illustrated in FIG. 4. FIG. 4 also illustrates touchpads 102 disposed substantially about the full width 118 of the outside edge 104. Furthermore, the touchpads 102 illustrated in FIG. 4 do not extend the entire length 116 of the outside edge 104, in contrast to the touchpads 102 illustrated in FIGS. 1, 2, and 3, which do extend substantially about the entire length 118 of the outside edge 104. As discussed previously, the touchpads 102 can be disposed about any portion of any combination of outside edges 104, provided the touchpad 102 is disposed about at least a portion of at least one outside edge 104.

The touchpad provided by the present invention is ideally suited to navigating within a display, such as a graphical user interface of a computer, personal digital assistant, or wireless communication device. Items depicted within a display are interchangeably referred to herein as "objects" and "information" and include, but are not limited to, any text, graphics, pointers (interchangeably referred to herein as cursors), icons, characters, images, etc. depicted with a display.

In an exemplary embodiment, the touchpad 102 is disposed about an outside edge of a display 106 such that the touchpad 102 corresponds to scroll bars depicted within the display. For example, the touchpad 102 can be similar in size and orientation to the scroll bars thereby providing direct hand-eye association. Consequently, the user would instinctively know how to touch or slide their finger across the touchpad 102 to, for example, cause a scrolling action of information depicted within a display or to move a cursor depicted within a display. Thus, touching or sliding a finger across the touchpads 102 on the appropriate edge of the display produces a corresponding movement within the display, such as a corresponding cursor movement or scrolling action, in a natural, easy to use, accurate, and effective manner. This is in contrast to current input methods that are unnatural, indirect, and inefficient. For example, a typical input method currently used for scrolling within a display may involve using a mouse, located separately from the computer and the display, to move a cursor in the display to a scroll bar depicted in the display, and to pull the scroll button up or down. Using the present invention, however, a user merely has to slide a finger across a touchpad 102 positioned about the edge of a display, thereby directly scrolling in the desired direction, using natural hand/finger movements that correspond to the desired scrolling direction.

The specific functionality of the touchpad 102 can be defined by software. For example, a touchpad 102 disposed about the right outside edge 104 or perimeter 110 of a housing could be used for up/down scrolling of a display, a touchpad 102 disposed about the bottom outside edge 104 or perimeter 110 of a housing could be used for skipping forward/backward in a web browser to view web pages, and a touchpad 102 disposed about the left outside edge 104 or perimeter 110 could be used to adjust the volume of an audio device.

As used herein, "input" refers to any form of control provided by a user of a device and may or may not be directed at objects or information depicted within a graphical display. As previously discussed, the present invention is not limited to devices comprising displays, and thus "input" for purposes of the present invention, is not limited to controlling objects or information depicted within a display. Input can refer to the adjustment by a user of any variable in a wide variety of devices that may or may not comprise displays. Examples of "input" include, but are not limited to, one-dimensional control in a display such as scrolling, zooming, adjusting a slider control or scroll bar; two-dimensional control in a display such as cursor/pointer navigation (including selecting objects, or "pointing and clicking"); three-dimensional manipulations in a display (such as rotating an object depicted in a display); or otherwise adjusting any variable (interchangeably referred to herein as parameters), that may or may not be depicted in a display (such as in the form of a slide control depicted in a graphical display), such as volume or sound characteristics, display characteristics, temperature, lighting in a room, etc.

The touchpad 102 can detect both touching and sliding motions to provide substantial specificity and versatility of user input. For example, the user can contact the touchpad 102 with a sliding movement across the touchpad 102 to, for example, scroll within a display, adjust a slider control depicted within a display, adjust the volume of an audio device, or to adjust the brightness or contrast of a display. Alternatively, the user may contact the touchpad with a touching motion, wherein the user contacts a specific region of the touchpad, and then disengages contact with the touchpad, in the absence of a sliding motion. Such a touching motion may be referred to as a lift-and-tap motion. Such touching could be used, for example, to select items within a graphical display, thereby providing an alternative to buttons, such as mouse buttons, for input.

The touchpad 102 is also ideally suited as a secondary input device to complement other input devices that may serve as a primary input device. For example, the touchpad 102, which in preferred embodiments is substantially a long, narrow strip shape, is ideally suited for providing one-dimensional (i.e., uni-dimensional or linear) control. This is particularly true for controlling objects or information depicted within a display, such as in scrolling information, controlling a slider control, or otherwise adjusting a variable. These control functions can complement the functionality of a primary control device such as, for example, a mouse or another touchpad used for controlling a cursor/pointer depicted in a graphical display. In this instance, the primary control device is used for navigating an on-screen cursor/pointer around a graphical user interface and for selecting desired functions from on-screen menus or icons (i.e., the primary control device is used for "pointing and clicking"), while the touchpad can be used for controlling one-dimensional functions such as scrolling, zooming, and adjusting slider controls or other variables. In this aspect, the touchpad acting as a secondary input device serves as a valuable, easy to use aspect of the user interface.

In another exemplary embodiment, the touchpad 102 extends substantially about all outside edges 104 or perimeters 110 of the device housing 100, thereby providing a steering-wheel-like input arrangement. Such an arrangement is well suited, for example, for navigating a web browser or a game program.

In yet another exemplary embodiment, a plurality of touchpads 102 are used simultaneously with two hands or fingers for dual input. For example, a touchpad 102 on each of two opposite, lateral outside edges 104 or perimeters 110 of a device housing 100 could be used simultaneously, such as by sliding a finger of each hand across each touchpad, thereby providing dual input.

In a further embodiment of the present invention, touchpads 102 provide multi-dimension control of objects depicted in a display, particularly three-dimensional control/manipulation such as rotation. For example, this can preferably be achieved with multiple touchpads 102 disposed about multiple outside edges 104. Preferably, each touchpad 102 controls movement in a single dimension (dimension(s) are interchangeably referred to herein as "axis" or "axes"), including rotation about a single axis, and each touchpad is dedicated to controlling movement in a dimension or axis different than that controlled by the other touchpad(s). For example, a touchpad 102 disposed about one outside edge 104 can control movement or rotation about the x-axis, a second touchpad 102 disposed about a different outside edge 104 can control movement or rotation about the y-axis, and a third touchpad 102 disposed about a third outside edge 104 can control movement along the z-axis (e.g., virtual z-axis movement, such as zooming in and out to provide the appearance of movement away from or towards the user). Thus, multi-dimensional (i.e., two- or three-dimensional) control can readily be achieved by a plurality of touchpads 102 that each control movement in a single dimension/axis or rotation about a single axis. Any number of touchpads can be utilized for multi-dimensional manipulation. For example, a single touchpad 102 can be utilized to achieve rotation about a single axis. Alternatively, software can be used to define different axes of control for particular touchpads. For example, a graphically depicted "toggle-switch" can be used to control whether a particular touchpad 102 controls rotation about the x- or y-axis. In certain embodiments, two touchpads 102, each controlling movement in a single dimension/axis or rotation about a single axis, wherein each touchpad is dedicated to controlling movement in a dimension/axis different that the other touchpad, the touchpads being disposed about two different outside edges 104 (preferably opposite outside edges 104), may be used for multi-dimensional control such as rotation or cursor control.

In embodiments comprising more than one touchpad 102 for multi-dimensional control, dual input from the user can be used to provide multi-dimensional control and this dual input can be realized in the form of simultaneous contact with a plurality of touchpads 102 using two hands/fingers. However, for multi-dimensional control to be achieved, dual input, particularly simultaneous dual input, is not required. Input can be achieved by contacting a single touchpad 102, or by contacting multiple touchpads 102 one at a time, for providing multi-dimensional control. Thus, user input for multi-dimensional control can be realized, for example, in the form of a sliding contact along one or more touchpads 102 or multiple sliding contacts provided simultaneous along two or more touchpads 102.

The present invention is ideally suited to portable electronic devices, such as laptop computers, personal digital assistants, and wireless communication devices, because of the efficient use by the present invention of housing space, thereby allowing the overall size and weight of a device to be minimized, which is highly desirably for portable devices. The present invention makes maximum use of available housing space that is presently not being efficiently utilized in prior art devices to any significant extent. Furthermore, as portable electronic devices become smaller, it becomes increasingly difficult to provide effective input devices that a user can effectively and easily use, and that do not require awkward hand positioning or hand/finger movements. Additionally, such portable devices typically comprise graphical displays. The present invention provides an ideal input device for navigating such graphical displays, such as for maneuvering a cursor or scrolling within a display.

In addition to allowing the overall electronic device size to be minimized, the present invention further enhances the portability of electronic devices in that the invention does not consist of any protruding elements, such as joysticks, knobs, buttons, or switches. Furthermore, the present invention may allow such protruding elements to be eliminated from the device housing, if desired.

No redesign or rearrangement of presently existing device elements, such as keys, control buttons, or trackballs, is required to implement the present invention. However, many of these presently existing device elements can be replaced by the present invention, allowing smaller electronic devices to be designed. For example, on laptop computers, the present invention eliminates the need for the keyboard to be set back in order to provide space for a touchpad or trackball on the housing face 114 forward of the keyboard 108, as is common in conventional arrangements. The present invention utilizes areas of an electronic device housing that are not currently being used to any significant extent.

The present invention is also ideally suited for keyboards. Touchpads positioned on the outside edges 104 or perimeters 110 of a keyboard housing allow a user to easily touch the outside edges with the little fingers or the thumbs, while the remaining fingers remain substantially in typing position, thereby allowing a user to provide input, such as scrolling or cursor movement within a graphical display, without significantly slowing typing speed. The outside edge 104 of a housing, such as a keyboard housing, is easy for a user to find without looking and easy for a user to maintain finger or hand position by feel.

The present invention provides enhanced ergonomics in several respects. First of all, the outside edge of a device housing, and thus a touchpad such as a long touch-strip disposed about the outside edge, is easily located by tactile feel. Additionally, a user is able to comfortably rest their wrist on the face of a device housing, such as a keyboard housing, while the little fingers or thumbs are used to touch or slide across touchpads 102 located on the outside edges 104 or perimeters 110 of the housing, thereby substantially reducing user fatigue. Additionally, the present invention allows the touchpad 102 to be as long as the outside edges 104 or perimeters 110 of the device housing, thereby providing for larger touchpads with enhanced functionality and ease of use compared with prior art input devices. By providing a larger touch sensitive area compared with prior art input devices, the present invention provides a larger area for input from which each individual user can select particular areas of the touchpad that they are most comfortable using based upon their individual technique, such as an individual's characteristic hand positioning. For example, some users may be more comfortable positioning their hands/fingers along different portions of the outside edge compared with other users in order to make contact with the touchpad disposed along the edge. By providing larger touchpad areas for input, the present invention is well suited to accommodate a wide variety of individual user input styles. Thus, it is preferable for the touchpad 102 to be substantially a long, narrow strip that covers the majority of the length 116 of each outside edge 104, thereby allowing users to contact any portion of the outside edge 104 that they are comfortable using for input/control. An additional advantage of having a long touchpad, such as a substantially strip-shaped touchpad, disposed about the majority of the outside edge is that a user does not have to locate a specific position along the outside edge for input. Rather, the user can use tactile feel to quickly locate and contact any portion of the outside edge for input/control. Larger effective control areas also provide higher resolution control for enhanced accuracy and ease of use, such as when controlling a cursor or slide control, scrolling, zooming, adjusting a variable/parameter, or performing three-dimensional manipulations within a graphical user interface.

Non-contact electric-field-based position sensors allow the position of a hand or piece of conductive material to be determined at some distance from the transducers. Similarly, optical sensors can determine the position of visible objects at a distance. Any of these sensing means may be used as input to a device by which the user can manipulate the actions of the device by position or movement of a hand or other object. Thus the touchpad as described herein consists of the area or region in space over which position and motion can be sensed, and is not limited to the sensing apparatus itself or its immediate proximity.

Generally, proximity sensors are well known. For example, teachings of electric field detection of a user's finger, hand, etc, may be found in the following U.S. patents: U.S. Pat. No. 5,914,701, entitled "Non-Contact System For Sensing And Signalling By Externally Induced Intra-Body Currents", and U.S. Pat. No. 5,844,415, entitled "Method For Three-Dimensional Positions, Orientation And Mass Distribution", and U.S. Pat. No. 6,066,954, entitled "Apparatus For Resolving Presence And Orientation Within A Defined Space", and U.S. Pat. No. 5,914,610 entitled "Apparatus And Method For Characterizing Movement Of A Mass Within A Defined Space". The teachings of the above referenced U.S. patents is hereby incorporated by reference.

The above referenced U.S. patents illustrate how the position and motion of a user's hand or finger can be detected without contact. Also, the detection apparatus need not be distributed along the edge or surface on which the user's "touch" is being sensed. The position sensing can be done from a short distance away, for example, at the corners of a keyboard, a display, or a computer housing.

The touchpad 102 may also have a distinctive surface texture, such as a ridged or bumped surface, to help provide tactile feedback to the user as the fingertip touches or moves across the surface of the touchpad 102.

The present invention also provides a high degree of reliability. Unlike input devices such as trackballs, the input device by the present invention does not have any moving parts and is not susceptible to mechanical contamination, thereby providing optimal reliability with minimal maintenance.

Figure 5:
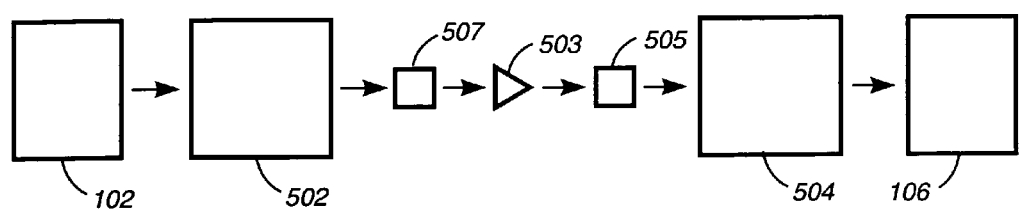
FIG. 5 is a block diagram showing exemplary circuitry for translating input from the touchpad input device into output on a display.

FIG. 5 shows exemplary circuitry for translating input from the touchpad 102 to output on a display 106. The touchpad 102 is linked to a user input detector 502, for detecting user input. The user input detector may comprise, for example, capacitive sensing technology for detecting user input. User input is realized by touching about the touchpad 102, such as by touching or sliding with a finger. By using sensing technology such as capacitive sensing technology, the user input detector is extremely sensitive and able to detect slight touching. The user input detector may also comprise, for example, resistive or semiconductive sensing technology. Any technology that provides touch-sensitive detection is suitable. In the exemplary circuitry shown in FIG. 5, an analog-to-digital converter 507 changes electrical signals from the user input detector 502 into digital information recognizable by the control circuit, such as a microprocessor, of an electronic device. Also in the exemplary circuitry illustrated in FIG. 5, user input signals detected by the user input detector 502 may be amplified by an amplifier 503. In the exemplary circuitry, the amplified signal is then filtered to remove noise and compared to a pre-determined threshold level by the threshold comparator 505 to determine if the signal represents true user input. If the signal exceeds the predetermined threshold level, then the signal is relayed to the control circuit 504 which may be, for example, a microprocessor. The control circuit 504 then acts upon the input signal to, for example, generate appropriate output. In the exemplary circuitry, the output is sent to a display 106 that may present the output in, for example, a graphical user interface depicted by the display. Such output may be used to navigate within the display such as, for example, to control scrolling, cursor movement, zooming in or out, or adjustment of slider controls presented in the display. However, the output can take many forms other than navigating with a display. For example, the output could instead be used to perform tasks that are typically handled by mechanical controls such as knobs, keys, sliders, buttons, and switches. Such output tasks may include, for example, adjusting audio volume or adjusting the brightness or contrast of a display.

The present invention also provides a method of input comprising the steps of touching about an outside edge 104 or a perimeter 110 along an outside edge 104, of a housing; detecting the touching; relaying an electrical input signal to a control circuit upon detecting the touching; and generating an appropriate output signal based on the input signal, or otherwise acting appropriately on the input signal. Preferably, the output signal may be sent to a display, such as to navigate within a graphical user interface depicted by the display. Navigating within the display may include, for example, controlling cursor movement or causing a scrolling action of information presented by the display. The step of touching about an outside edge 104 or a perimeter 110 may comprise, for example, a touching motion, such as a lift-and-tap movement, or a sliding motion.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. An electronic device comprising:
   a housing comprising a face, a back and an outside edge, the back being located substantially behind the face, the outside edge comprising at least two adjoining sections and at least one corner edge wherein two adjoining sections of the outside edge are connected at an angle by each of the at least one corner edge;
   at least one touchpad that is continuously disposed along the at least two adjoining sections and the at least one corner edge of the outside edge of the housing in order to form a single touchpad along the at least two non-parallel sections and the at least one corner edge; and a user input detector, electrically coupled to the at least one touchpad, for detecting user input from the at least one touchpad, wherein a sliding contact with the at least one touchpad causes an adjustment of an operating variable unrelated to graphical object display.

2. A touchpad input device comprising:

a touchpad disposed along at least portion of at least one outside edge of a housing;

a display located within the housing, the at least one outside edge of the housing being located about at least one edge of the display, and the touchpad being disposed along at least a portion of the at least one edge of the display;

a dimension selection switch able to select one of at least two dimensions;

a user input detector, electrically coupled to the touchpad and the dimension selection switch, for detecting user input from the touchpad and a selected dimension selected by the dimension selection switch and transmitting input signals, wherein the input signals controls movement in the selected dimension in response to the user input; and a control circuit electrically coupled to the user input detector and the display; wherein the control circuit acts upon the input signals from the user input detector and transmits output signals to the display.

3. The touchpad input device of claim 2, wherein the touchpad extends substantially about a perimeter of the housing along the at least one outside edge of the housing.

4. The touchpad input device of claim 2 wherein the touchpad comprises at least one of a distinctive shape and texture, for providing a tactile feedback to the user.

5. The touchpad input device of claim 2, further comprising an analog-to-digital converter electrically coupled between the user input detector and the control circuit for converting electrical signals into digital information readable by the control circuit.

6. The touchpad input device of claim 2, further comprising a threshold comparator electrically coupled between the user input detector and the control circuit.

7. The touchpad input device of claim 2, further comprising an electric signal amplifier electrically coupled between the user input detector and the control circuit.

8. The touchpad input device of claim 2, wherein the touchpad comprises a touchpad strip disposed along at least a portion of at least one outside edge of the housing for detecting user input along the touchpad strip.

9. An electronic device comprising:

a housing comprising a face, a back and an outside edge,
the back being located substantially behind the face,
the outside edge comprising at least two adjoining sections and at least one corner edge wherein two adjoining sections of the outside edge are connected at an angle by each of the at least one corner edge;

at least one touchpad that is continuously disposed along the at least two adjoining sections and the at least one corner edge of the outside edge of the housing in order to form a single touchpad along the at least two non-parallel sections and the at least one corner edge; and a user input detector, electrically coupled to the at least one touchpad, for detecting user input from the at least one touchpad, wherein the at least one touchpad comprises a plurality of sections and each section of the at least one touchpad controls movement in one of at least two different one-dimensional axes, whereby user input provided along the plurality of sections provides multi-dimensional manipulation of objects displayed on a display screen, wherein the multi-dimensional manipulation of objects comprises three-dimensional manipulation of objects displayed on the display screen, wherein the three-dimensional manipulation comprises one of zoom and rotate, and wherein the at least two touchpads comprise at least three touchpads, and wherein each of the at least three touchpads correspond to one of x-axis manipulation, y-axis manipulation and one of zoom and rotate.

10. The method of claim 2, wherein one of the at least two dimensions is one of zoom and rotate.

* * * * *